(12) United States Patent
Zhou et al.

(10) Patent No.: US 7,102,323 B2
(45) Date of Patent: Sep. 5, 2006

(54) HIGH POWER DENSITY/LIMITED DC LINK VOLTAGE SYNCHRONOUS MOTOR DRIVE

(75) Inventors: George Zhou, Mississauga (CA); Jack Ma, Mississauga (CA); Zheng Wang, Mississauga (CA)

(73) Assignee: Honeywell International Inc., Morris Township, NJ (US)

(*) Notice: Subject to any disclaimer, the term of this patent is extended or adjusted under 35 U.S.C. 154(b) by 0 days.

(21) Appl. No.: 11/274,499

(22) Filed: Nov. 16, 2005

(65) Prior Publication Data

US 2006/0113952 A1 Jun. 1, 2006

Related U.S. Application Data

(60) Provisional application No. 60/631,429, filed on Nov. 30, 2004.

(51) Int. Cl.
H02P 27/04 (2006.01)

(52) U.S. Cl. ............... 318/801; 318/802; 318/800; 318/806

(58) Field of Classification Search ............. 318/801, 318/802, 685, 800, 806, 822, 434, 700, 717
See application file for complete search history.

(56) References Cited

U.S. PATENT DOCUMENTS

| | | | |
|---|---|---|---|
| 4,275,343 A | 6/1981 | Fulton et al. | |
| 4,511,834 A | 4/1985 | Studtmann | |
| 5,402,053 A | 3/1995 | Divan et al. | |
| 5,739,664 A | 4/1998 | Deng et al. | |
| 5,841,262 A | 11/1998 | Tang | |
| 5,994,869 A | 11/1999 | Becerra | |
| 6,051,941 A | 4/2000 | Sudhoff et al. | |
| 6,069,808 A | 5/2000 | Panahi et al. | |
| 6,215,261 B1 | 4/2001 | Becerra | |
| 6,343,021 B1 | 1/2002 | Williamson | |
| 6,489,742 B1 | 12/2002 | Lumsden | |
| 6,586,898 B1 | 7/2003 | King et al. | |
| 6,710,573 B1 | 3/2004 | Kadah | |
| 6,753,670 B1 | 6/2004 | Kadah | |
| 2002/0149336 A1 | 10/2002 | Bida | |
| 2003/0035308 A1 | 2/2003 | Lynch et al. | |
| 2004/0021437 A1 | 2/2004 | Maslov et al. | |
| 2004/0124796 A1 | 7/2004 | Bailey et al. | |
| 2005/0127865 A1* | 6/2005 | Kiuchi et al. | 318/802 |
| 2005/0218858 A1* | 10/2005 | Takemori et al. | 318/685 |

* cited by examiner

*Primary Examiner*—Karen Masih
(74) *Attorney, Agent, or Firm*—Birch, Stewart, Kolasch & Birch, LLP

(57) ABSTRACT

A method and an apparatus optimize performance of a motor drive system. The method according to one embodiment comprises: selecting a property for a rated operation point; selecting inverter system characteristics and motor characteristics such that a motor drive system including an inverter system having the selected inverter system characteristics operatively connected to a motor having the selected motor characteristics will have a rated operation point exhibiting the property; providing an inverter system having the selected inverter system characteristics; operatively connecting a motor having the selected motor characteristics to the inverter system; and minimizing current of the motor drive system including the motor operatively connected to the inverter system in entire operating range of the motor drive system.

20 Claims, 18 Drawing Sheets

Table 1 Select extensive number of parameters of motor drive system

| Parameter | Description | Source | |
|---|---|---|---|
| | | Selection Rule / Equation | Example |
| Pout | Motor Output Power | System Requirement | 100KW |
| Vdc | Inverter Input DC Voltage | System Requirement | 540V |
| Irated | Motor Rated Speed | System requirement | 36000 rpm |
| PWM | Inverter PWM methods | Inverter Design selection | Space Vector Modulation |
| Tdead | Inverter Dead Time | Inverter Design selection | 3us |
| Tminimal | Inverter Minimal Pulse | Inverter Design selection | 1us |
| fsw | Inverter Switching Frequency | Inverter Design selection | 15KHz |
| Tsampling | Digital Controller Sampling Rate | Digital Controller design selection | 33 µS |
| Vac_limit | Inverter Max AC voltage | $V_{ac\_limit} = V_{dc}/1.732$ | 311.8 V |
| Mmax | Inverter Max Modulation Index | $M_{max} = 1 - 2*(T_{dead} + T_{minimal})*f_{sw}$ | 0.88 |
| ηinv | Inverter efficiency | $\eta_{inv} = 1 - P_{inv\_loss}/P_{dc}$ | 0.95 |
| ηmotor | Motor efficiency | $\eta_{motor} = 1 - P_{motor\_loss}/P_{dc}$ | 0.95 |
| E | Motor back EMF | Iteration design selection, initialize with Vac_limit | (150 V ~ 270V) |
| Lm | Motor Stator inductance | $Lm = (0.3 \sim 0.4) * 3 * V_m * V_m / P_{out} / \omega_{rated}$ (Vm can be replace by Vac_limit to simplify the starting of the off-line design iteration.) | 110 µH ~ 150 µH |
| p | Motor poles number | Motor design selection | 1 |
| ωrated | Motor Rated Angle Speed | $\omega_{rated} = I_{rated} * p * 2\pi/60$ | 3769.9 rad/s |
| frated | Inverter / Motor rated fundamental frequency | $f_{rated} = \omega_{rated}/2\pi$ | 600Hz |
| fcut_off | Inverter Output Filter Cut off frequency | $3*f_{rated} < f_{cut\_off} < (1/4 \sim 1/2)*f_{sw}$ | 3KHz ~ 4KHz |
| L | Inverter Output Filter inductance | $L = (0.2 \sim 0.4) * Lm$ or $L = 1/(2\pi*f_{cut\_off})$, whichever is less and more reasonable | 30 ~ 50 µH |
| C | Inverter Output Filter capacitance | $C = (0.1 \sim 0.2) * P_{out}/(3 * V_m * V_m * \omega_{rated})$, or $C = 1/[(2\pi*f_{cut\_off})*(2\pi*f_{cut\_off})*L]$ Whichever is less and more reasonable (L, C is suggested to be kept similar value to balance the size / weight) | 30 ~ 50 µF |

…

HIGH POWER DENSITY/LIMITED DC LINK VOLTAGE SYNCHRONOUS MOTOR DRIVE

CROSS REFERENCE TO RELATED APPLICATION

The present application claims priority under 35 USC §119(e) to U.S. Provisional Application No. 60/631,429 filed Nov. 30, 2004, which is hereby incorporated by reference herein in its entirety.

BACKGROUND OF THE INVENTION

1. Field of the Invention

The present invention relates to motor drive systems, and more particularly to a technique for design/control of a motor drive system including a DC-AC inverter and a synchronous motor.

2. Description of the Related Art

Large vehicles such as aircraft and ships include a multitude of electrical and mechanical systems that perform complex tasks and require large amounts of energy. Synchronous motor drive systems are suitable for large vehicles. Synchronous motor drives are energy conversion systems that can produce large amounts of energy at high power and high speed, as needed for complex equipment onboard large vehicles. Synchronous motor drive systems are especially efficient with the use of permanent magnet synchronous motor (PMSM) systems due to reduced resulting size and weight.

A typical motor drive system topology for advanced system environments such as "more electric" aircraft with "fly-by-wire" systems is a three phase voltage source DC-AC inverter-driven synchronous motor. The inverter could be installed remotely from the motor, which is integrated into a system such as a cabin air compressor. When the inverter is not in close proximity to the motor, an output AC differential LC filter is used to mitigate high voltage variations occurring on the motor end. Such high voltage variations correspond to high voltage-time derivatives and are caused by long cables connecting the motor to the inverter. The output AC differential LC filter reduces the stress on the motor and helps meet electromagnetic compatibility requirements.

A motor drive system usually needs to accommodate various input DC bus voltage ranges, which ultimately cause variations in the limits of the inverter output AC voltage range. A motor drive system also needs to accommodate various load conditions. The variability in inverter output AC voltage range and load conditions impacts motor drive system performance.

Commercial motor drive systems are generally designed for constant torque operation below the rated operation speed, and constant power operation above the rated operation speed. The rated operating point for the motor drive system is located at the rated speed, where maximum power is achieved. Hence, the inverter and the motor are optimized separately based on the rated operation point.

When high power from a motor drive system is required, the DC bus voltage applied to the motor drive system needs to be increased accordingly, to accommodate the increased back electromotive force resulting from the motor design. The motor current rating is limited by the motor design, which includes the design of motor winding. The winding included in a motor drive system can be large and heavy. Installing, reinstalling, or replacing the winding inside the motor is a difficult task. The DC bus voltage is used to compensate for motor design limitations. For example, medium and high voltage DC buses are designed for megawatts motor drive systems used in commercial applications.

However, in many applications such as the more electric aircraft, the DC bus voltage that can be used to drive high power motor drive systems is limited. In these applications, separate design optimization of motor and inverter typically results in over-designing of the inverter and the motor to accommodate the peak power/peak current requirements. An additional drawback of separate optimization of motor and inverter design is that the motor drive system design is not optimized for overall system efficiency/power density, especially when an output LC filter is installed between the inverter and the motor. Such a filter is often required in applications such as the more electric aircraft, etc.

A few publications have studied improved efficiency schemes for motor drive systems. One such technique is described in "Method and System for Improving Efficiency of Rotating, Synchronous, Electrical Machine Interacting with Power Converter", Roman Bida, US Patent Application 2002/0149336 A1. With the method described in this work, the efficiency of a motor drive is improved by introducing a spectrum of harmonic components in a power converter supplying energy to the motor. The harmonic components control the current of the power converter so that the current becomes identical in shape and phase to the back electromotive force (back EMF) of the motor. This concept, however, does not provide overall optimization of the motor drive system, as it optimizes only the motor section of the system.

Another technique is described in "Back EMF Controlled Permanent Magnet Motor", D. Fulton and W. Curtiss, U.S. Pat. No. 4,275,343. In this publication, however, only the back EMF control of the motor is optimized. Again, no overall optimization of the motor drive system for design and control of both inverter and motor is performed.

A disclosed embodiment of the application addresses these and other issues by utilizing a high power density/limited DC link voltage motor drive system, with design and control optimization achieved for the combination of inverter and motor system.

SUMMARY OF THE INVENTION

Embodiments of the present invention are directed to a method and an apparatus for optimizing performance of a motor drive system. According to a first aspect of the present invention, a method of optimizing performance of a motor drive system comprises: selecting a property for a rated operation point; selecting inverter system characteristics and motor characteristics such that a motor drive system including an inverter system having the selected inverter system characteristics operatively connected to a motor having the selected motor characteristics will have a rated operation point exhibiting the property; providing an inverter system having the selected inverter system characteristics; operatively connecting a motor having the selected motor characteristics to the inverter system; and minimizing current of the motor drive system including the motor operatively connected to the inverter system in entire operating range of the motor drive system.

According to a second aspect of the present invention, a system comprises: a motor having motor characteristics; an inverter system having inverter system characteristics, wherein the motor characteristics and the inverter system characteristics are selected such that a motor drive system including the motor and the inverter system operatively connected to each other has a rated operation point with a predetermined property; and a controller operatively connected to the motor drive system, the controller minimizing current of the motor drive system in entire operating range of the motor drive system.

BRIEF DESCRIPTION OF THE DRAWINGS

Further aspects and advantages of the present invention will become apparent upon reading the following detailed description in conjunction with the accompanying drawings, in which:

FIG. 11 is a table containing typical values for design and operating parameters of the motor drive system used in the 100 KW/540V aircraft cabin air compressor system.

DETAILED DESCRIPTION

Figure 1:
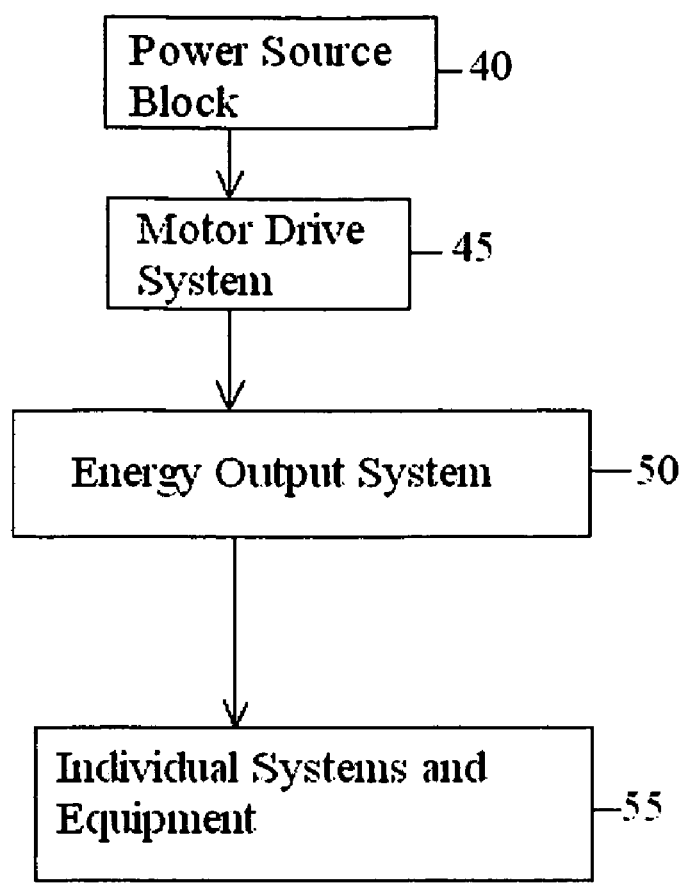
FIG. 1 is a block diagram of an electrical/mechanical system containing a motor drive system with design/control optimization according to an embodiment of the present invention.

Aspects of the invention are more specifically set forth in the accompanying description with reference to the appended figures. FIG. 1 is a block diagram of an electrical/mechanical system containing a motor drive system with design/control optimization according to an embodiment of the present invention. The electrical/mechanical system 100 illustrated in FIG. 1 includes the following components: a power source block 40; a motor drive system 45 with design/control optimization; an energy output system 50; and individual systems and equipment 55. Operation of the electrical/mechanical system 100 in FIG. 1 will become apparent from the following discussion.

Electrical/mechanical system 100 may be associated with systems with electrical and mechanical components such as a cabin air compressor system, a heating system, a traction system, etc., in an aircraft, a ship, a train, a laboratory facility, etc. Power source block 40 provides electrical power to motor drive system 45. Power source block 40 handles wattage power that can be hundreds of kW, or MW, and voltages that can be hundreds to thousands of Volts. The output of power source block 40 may be a smoothed DC voltage. Power source block 40 may include transformers, rectifiers, thyristors, filters, and circuit breakers. Motor drive system 45 transforms electrical energy received from power source block 40 into mechanical energy. Motor drive system 45 may include electrical circuits and components, as well as magnetic components such as coils and permanent magnets. Energy output system 50 outputs the energy generated by motor drive system 45 to individual systems and equipment 55. Energy output system 50 may include shafts, gearboxes, wheels, transmission systems, electrical sensors, and electrical circuits. Individual systems and equipment 55 are systems that enable functioning of services onboard a vehicle, or in a lab. Individual systems and equipment 55 may include a cabin air compressor, an electric generator, a set of wheels, a traction system, a braking system, etc.

Figure 2:
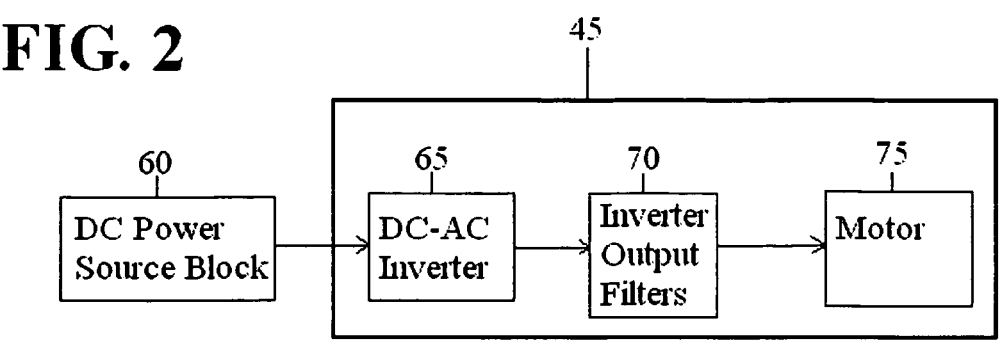
FIG. 2 is a block diagram of a motor drive system with design/control optimization according to an embodiment of the present invention.

FIG. 2 is a block diagram of a motor drive system 45 with design/control optimization according to an embodiment of the present invention. Motor drive system 45 includes the following components: a DC-AC inverter 65; inverter output filters 70; and a motor 75. DC power source block 60 provides electric DC input to DC-AC inverter 65. DC power source block 60 belongs to power source block 40. DC-AC inverter 65 converts the electric DC input received from DC power source block 60 into an electric AC voltage. DC-AC inverter 65 is an electrical system that may include semiconductor devices, energy storage components such as capacitors, etc. Inverter output filters 70 eliminate voltage-switching noise caused, for example, by long cables connecting the inverter output filters 70 to motor 75. Inverter output filters 70 may also eliminate noise in systems where shielding is not preferred, such as "more electric" aircraft systems. Inverter output filters 70 include electrical circuits and components such as inductors and capacitors. The AC voltage output filtered by inverter output filters 70 is input into motor 75, which outputs mechanical and electric energy. Motor 75 includes electronic and electromagnetic components such as electronic devices, metallic windings, and magnetic cores. Motor 75 may be a permanent magnet synchronous motor.

Figure 3:
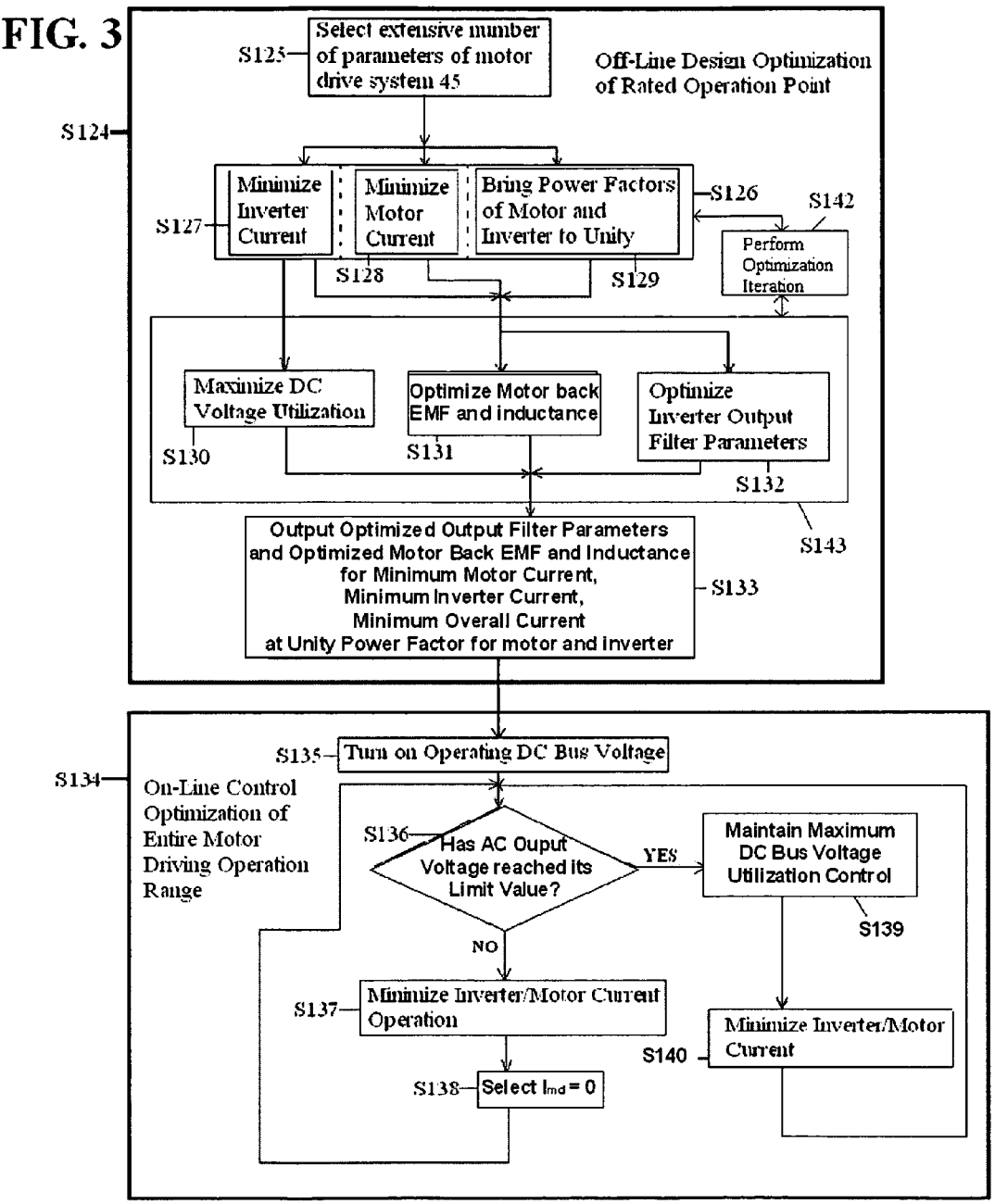
FIG. 3 is a flow diagram illustrating operations performed for overall design/control optimization of a motor drive system according to an embodiment of the present invention.

FIG. 3 is a flow diagram illustrating operations performed for overall design/control optimization of a motor drive system 45 according to an embodiment of the present invention. The flow diagram in FIG. 3 implements an optimization technique including both off-line design and on-line control for overall optimization of motor drive system 45 to obtain the maximum efficiency/power density. The optimization technique illustrated in FIG. 3 takes into account the rated operation point during the off-line design optimization, and the entire operating range during the on-line control optimization of motor drive system 45. Overall system optimization is achieved when the combination of design/control of inverter 65 and design/control of motor 75 is taken into account during the optimization process. The result is that motor drive system 45 is optimized for inverter unity power factor and motor unity power factor at the rated operating point, and for minimum current for both inverter and motor for the entire specified range of motor drive system operating conditions. According to an embodiment of the present invention, an extensive number of variable factors are considered. The impacts of the variable factors on overall capability of motor drive system 45 to reach optimized performance are assessed. An analytical solution that achieves the optimization goal is then established.

Minimizing the inverter 65 current and motor 75 current in the entire specified operating range of motor drive system 45 is the main criteria for the design and control optimization of the inverter/motor system design for high efficiency/ power density. A combination of off-line design optimization (S124) and on-line control optimization (S134) is implemented to accomplish overall design/control optimization of motor drive system 45.

In the off-line design optimization step S124, unity power factor is achieved for both inverter and motor at the rated operating point which is selected as the maximum efficiency point. To optimize the maximum efficiency point, an extensive number of motor drive system 45 parameters are selected (S125). The selected parameters are input into an optimization block where off-line optimization design constraints are applied (S126). The off-line optimization design step S126 uses an optimization iteration step S142 to find the optimized values of the selected parameters that minimize inverter 65 current (S127), minimize motor 75 current (S128), and bring the power factors of motor 75 and inverter 65 to unity (S129). For this purpose, combinations of motor drive system 45 parameters that satisfy the off-line design optimization constraints in steps S127, S128 and S129 are found.

Motor back electromotive force (EMF) and inductance value selection for motor 75, as well as filter parameters for inverter output filters 70 are found in optimization step S143. Minimum inverter current is achieved when DC voltage utilization for inverter 65 is maximized (S130). Motor back EMF and inductance value selection for motor 75 are optimized to ensure minimum motor current under the constraint imposed by the DC bus voltage limitation of inverter 65 (S131). Filter parameters for inverter output filters 70 are optimized so that minimum inverter and motor currents are obtained at the same time when both inverter 65 and motor 75 operate at unity power factor (S132). Step S124 for off-line design optimization of the rated operation point outputs optimized filter 70 parameters, and optimized motor back EMF and inductance for motor 75 (S133). The output filter and motor parameters help achieve minimum motor current, minimum inverter current and minimum overall current when power factors for both inverter and motor are at unity value, and maximum efficiency/power density is achieved for motor drive system 45 (S133).

The second step of design/control optimization of motor drive system 45 is on-line control optimization of the entire motor driving operation range (S134). In this step, the minimal current operation point for the optimized efficiency at all operating points is selected. As motor drive system 45 starts operation, DC bus voltage is turned on and connected to the inverter (S135). The inverter AC output voltage has an upper limit that is defined by the DC bus voltage. While the inverter AC output voltage is within the range defined by the AC output voltage upper limit (S136), inverter current, or motor current, or both, are minimized (S137), by applying a control strategy defined by $I_{md}=0$ for the motor drive system 45 (S138). This strategy aligns the motor current to the motor back EMF. When the AC output voltage hits the upper AC output voltage limit (S136), the constraint $I_{md}=0$ is not appropriate anymore, as the DC bus voltage cannot continue to produce the expected inverter AC voltage. In this case, maximum voltage control, which maintains the maximum DC bus utilization, becomes the primary goal in the on-line control optimization of motor drive system 45 (S139). The inverter current and motor current are next minimized at the controlled operating point (S140). Hence, with DC bus utilization maintained at the maximum value, the inverter 65 current, or the motor 75 current, or both, are at the minimum.

Figure 4A:
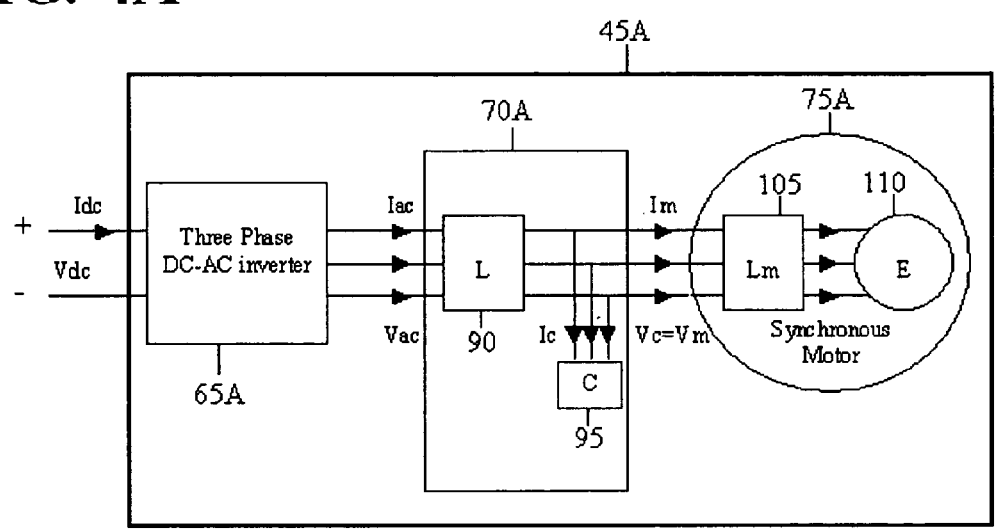
FIG. 4A is a block diagram of a motor drive system with design/control optimization including a LC filter in accordance with an embodiment of the present invention.

FIG. 4A is a block diagram of a motor drive system 45A with design/control optimization including a LC filter 70A in accordance with an embodiment of the present invention. Motor drive system 45A with design/control optimization includes three main components: a three phase DC-AC inverter 65A; an inverter output filter 70A; and a synchronous motor 75A. Inverter output filter 70A is an AC differential LC filter that includes an inverter output filter inductor 90 with inductance L and an inverter output filter capacitor 95 with capacitance C. Synchronous motor 75A includes a motor stator 105 and a rotor 110. The winding of motor stator 105 acts as an inductor with inductance $L_m$. The synchronous motor 75A optimized winding inductance $L_m$ is in a specific per unit value range suited for applications in which motor drive system 45A may be used. Rotor 110 generates a motor back electromotive force (motor back EMF) E. Three phase DC-AC inverter 65A converts a DC current input $I_{dc}$ and voltage input $V_{dc}$ into a three phase AC waveform with inverter bridge output current $I_{ac}$ and inverter bridge output voltage $V_{ac}$. Current $I_c$ passes through inverter output filter capacitor 95. Motor current $I_m$ passes through synchronous motor 75A, and creates motor terminal voltage $V_m$. Inverter output filter capacitor 95 is in parallel with synchronous motor 75A. Therefore motor terminal voltage $V_m$ is equal to inverter output filter capacitor voltage $V_c$.

Figure 4B:
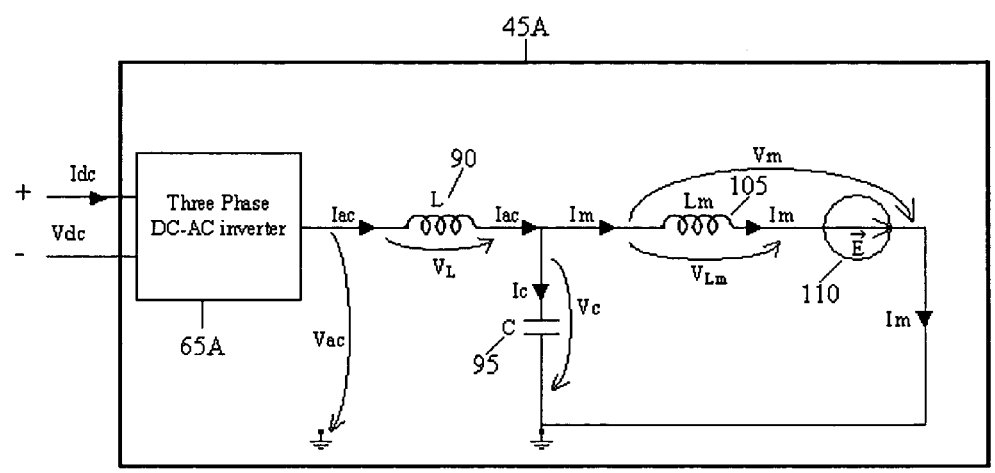
FIG. 4B is a functional block diagram of a motor drive system with design/control optimization including a LC filter in accordance with an embodiment of the present invention.

FIG. 4B is a functional block diagram of a motor drive system 45A with design/control optimization including a LC filter in accordance with an embodiment of the present invention. FIG. 4B illustrates all electrical components of the electrical circuit for motor drive system 45A in FIG. 4A.

Inverter bridge output current $I_{ac}$ gives rise to inverter bridge output voltage $V_{ac}$ and inverter output filter inductor voltage $V_L$. Inverter bridge output current $I_{ac}$ is split into current $I_c$ that creates voltage $V_c$ on capacitor 95, and motor current $I_m$ that gives rise to voltage $V_{Lm}$ on winding inductance $L_m$ of motor stator 105. The following mathematical relationships describe the electrical circuit of motor drive system 45A, where "j" is the complex unity, and "ω" is the angular frequency of the three phase AC signal output of inverter 65A:

$$Z_L = j\omega L \quad (1)$$

$$Z_{Lm} = j\omega L_m \quad (2)$$

$$Z_C = \frac{1}{j\omega C} \quad (3)$$

$$\vec{I}_{ac} = \vec{I}_m + \vec{I}_C \quad (4)$$

$$\vec{V}_{Lm} = Z_{Lm} \vec{I}_m = j\omega L_m \vec{I}_m \quad (5)$$

$$\vec{V}_L = Z_L \vec{I}_{ac} = j\omega L \vec{I}_{ac} \quad (6)$$

$$\vec{V}_C = Z_C \vec{I}_C = \frac{\vec{I}_C}{j\omega C} \quad (7)$$

$$\vec{V}_m = \vec{E} + \vec{V}_{Lm} \quad (8)$$

$$\vec{V}_C = \vec{V}_m \quad (9)$$

$$\vec{V}_{ac} = \vec{V}_L + \vec{V}_m \quad (10)$$

Figure 5:
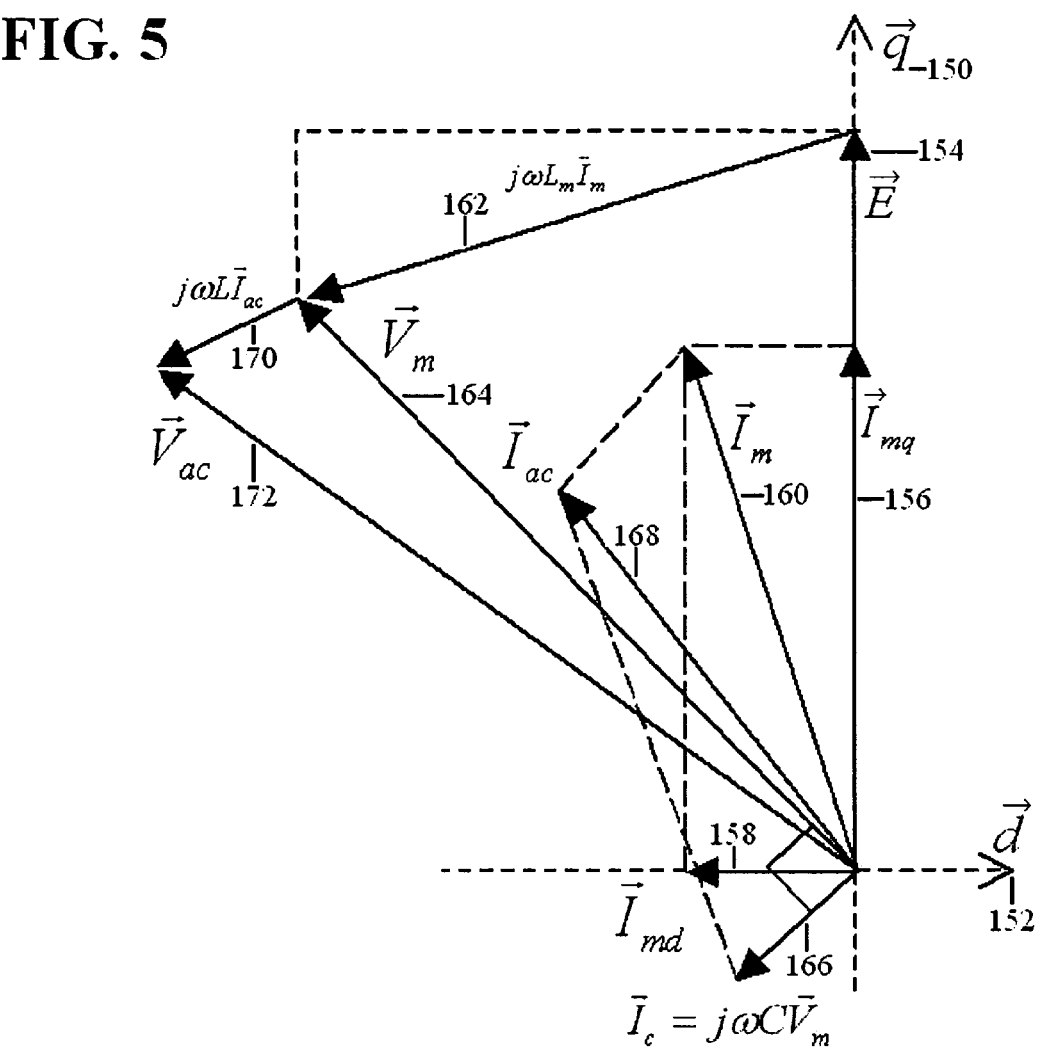
FIG. 5 is a vector diagram of the variables in a motor drive system for a mathematical model of the design/control optimization in accordance with an embodiment of the present invention.

FIG. 5 is a vector diagram of the variables in a motor drive system 45A for a mathematical model of the design/control optimization in accordance with an embodiment of the present invention. Motor drive system 45A, which is a three phase machine, can be described as a two phase machine through a transformation from a three phase coordinate system to a two phase coordinate system. The two-phase coordinate system has unit vectors $\vec{d}$ (152) and $\vec{q}$ (150) which are perpendicular to each other. In the dq motor axis coordinate system, motor current $\vec{I}_m$ has a d-axis component $I_{md}$ (158) and a q-axis component $I_{mq}$ (156). The complex unit "j" is along the $\vec{q}$ motor axis. Using the mathematical relationships (1)–(10) listed above, together with vectors $\vec{E}$ (154), $\vec{I}_m$ (160), $\vec{V}_{Lm} = j\omega L_m \vec{I}_m$ (162), $\vec{V}_m$(164), $\vec{I}_C = j\omega C \vec{V}_C = j\omega C \vec{V}_m$ (166), $\vec{I}_{ac}$ (168), $\vec{V}_L = j\omega L \vec{I}_{ac}$ (170), and $\vec{V}_{ac}$ (172) in FIG. 5, and aligning the $\vec{q}$ axis to the motor back EMF vector $\vec{E}$, the mathematical model for the design/control optimization in the motor drive system 45A is described by the equations below:

$$\vec{E} = 0 + jE \quad (11)$$

$$\vec{I}_m = I_{md} + jI_{mq} \quad (12)$$

$$\vec{V}_m = -\omega L_m I_{mq} + j(E + \omega L_m I_{md}) \quad (13)$$

$$\vec{I}_c = -\omega C(E + \omega L_m I_{md}) - j\omega^2 C L_m I_{mq} \quad (14)$$

$$\vec{I}_{ac} = [I_{md} - \omega C(E + \omega L_m I_{md})] + j(I_{mq} - \omega^2 C L_m I_{mq})$$
$$= I_{md}(1 - \omega^2 L_m C) - \omega C E + jI_{mq}(1 - \omega^2 C L_m) \quad (15)$$

$$V_L = -\omega L(I_{mq} - \omega^2 C L_m I_{mq}) + j\omega L[I_{md} - \omega C(E + \omega L_m I_{md})]$$
$$= (-\omega L I_{mq} + \omega L \omega^2 C L_m I_{mq}) + j(\omega L I_{md} - \omega^2 L C E - \omega L \omega^2 L_m C I_{md}) \quad (16)$$

$$\vec{V}_{ac} = -\omega L_m I_{mq} - \omega L I_{mq} + \omega L \omega^2 C L_m I_{mq} +$$
$$j[E + \omega L_m I_{md} + \omega L I_{md} - \omega^2 L C E - \omega L \omega^2 L_m C I_{md})]$$
$$= -\omega(L_m + L)I_{mq}\left[1 - \frac{L}{L_m + L}\omega^2 C L_m\right] +$$
$$j[E(1 - \omega^2 L C) + \omega(L_m + L)I_{md} - \omega L \omega^2 L_m C I_{md}]$$
$$= -\omega(L_m + L)I_{mq}\left[1 - \frac{L}{L_m + L}\omega^2 C L_m\right] +$$
$$j\left[E(1 - \omega^2 L C) + \omega(L_m + L)I_{md}\left(1 - \frac{L}{L_m + L}\omega^2 C L_m\right)\right] \quad (17)$$

Figure 6:
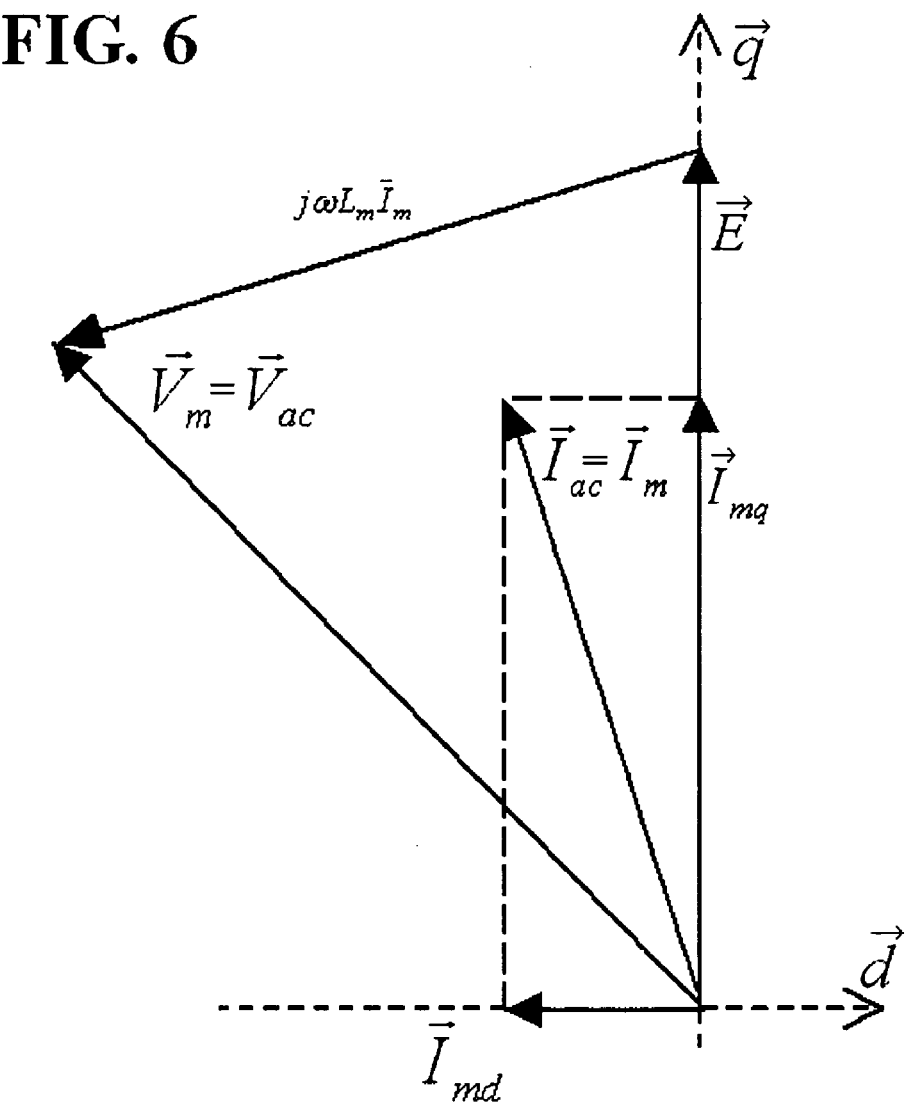
FIG. 6 is a vector diagram of the variables in a motor drive system for a mathematical model of the design/control optimization with zero inverter output filter inductance and capacitance according to an embodiment of the present invention.

FIG. 6 is a vector diagram of the variables in a motor drive system 45A for a mathematical model of the design/control optimization with zero inverter output filter inductance and capacitance according to an embodiment of the present invention. When L=0 and C=0, the relationships (15) and (17) become:

$$\vec{I}_{ac} = \vec{I}_m = I_{md} + jI_{mq} \quad (18)$$

$$\vec{V}_{ac} = V_m = -\omega L_m I_{mq} + j(E + \omega L_m I_{md}) \quad (19)$$

which describe the case when motor drive system 45A does not include a LC filter. Thus, the results obtained in the general case when motor drive system 45A includes inverter output filters are applicable to the particular case when motor drive system 45A does not include inverter output filters.

Figure 7A:
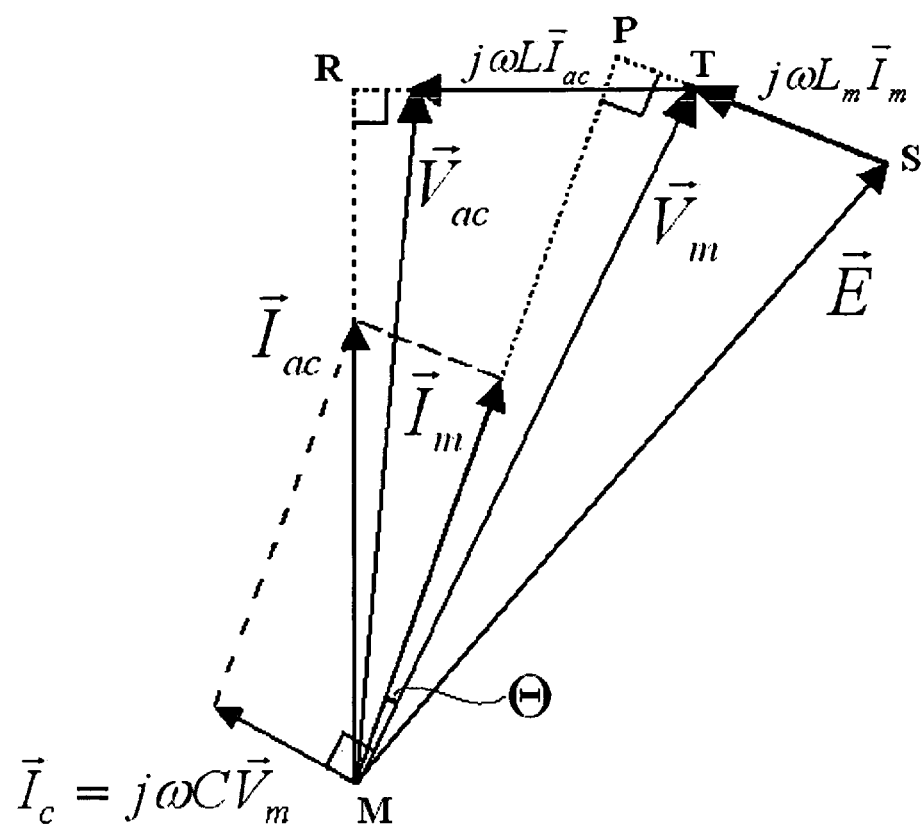
FIGS. 7A–7B illustrate off-line design optimization of the rated operation point in a motor drive system with design/control optimization in accordance with an embodiment of the present invention.

FIG. 7A illustrates off-line design optimization of the rated operation point in a motor drive system 45A with design/control optimization in accordance with an embodiment of the present invention. FIG. 7A illustrates the result of operations performed during the off-line design optimization step S124 in FIG. 3, before the optimized parameters for the rated operation point were identified. The power factor for motor 75A is equal to the cosine of the angle between the motor voltage $\vec{V}_m$, and the motor current $\vec{I}_m$, Power Factor=cos(Θ)). Maximum power factor is reached when cos(Θ))=1, that is when Θ=0. Since the angle Θ in FIG. 7A is small but not zero, the vector diagram in FIG. 7A depicts a motor drive system 45A status that is close to the optimized rated operation point but that has not yet reached the optimized rated operation point.

Figure 7B:
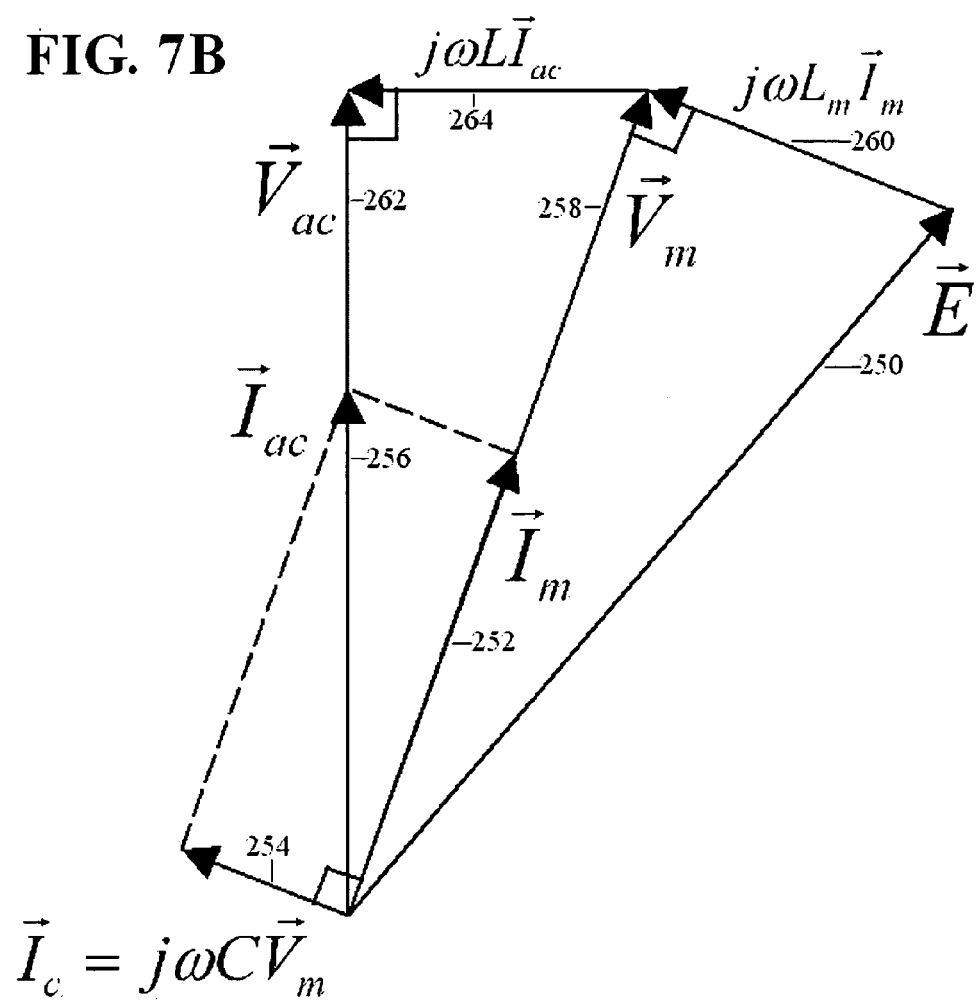

FIG. 7B illustrates off-line design optimization of the rated operation point in a motor drive system 45A with design/control optimization in accordance with an embodiment of the present invention. FIG. 7B is a vector diagram of the optimized rated operation point of motor drive system 45A, obtained from operations performed during the off-line design optimization step S124 in FIG. 3.

The identification of optimized parameters for the rated operation point done in step S124 in FIG. 3, is achieved using equations (11)–(17). The vector diagram in FIG. 7B exhibits unity power factors for motor 75A and inverter 65A, as the angles between $\vec{I}_m$ (252) and $\vec{V}_m$ (258), and $\vec{I}_{ac}$ (256) and $\vec{V}_{ac}$ (262) respectively, are zero. The resulting right angles between $\vec{V}_m$ (258) and $j\omega L_m \vec{I}_m$ (260), $\vec{V}_{ac}$ (262) and $j\omega L \vec{I}_{ac}$ (264), and $\vec{I}_m$ (252) and $\vec{I}_C = j\omega C \vec{V}_m$ (254) lead to the following relationships:

$$E^2 = V_m^2 + \omega^2 L_m^2 I_m^2 \quad (20)$$

$$V_m^2 = V_{ac}^2 + \omega^2 L^2 I_{ac}^2 \quad (21)$$

$$I_{ca}^2 = I_m^2 + \omega^2 C^2 V_m^2 \quad (22)$$

which, by mathematical manipulation, lead to a dependence of $I_m$ on L, C, E, and $L_m$ of the form:

$$I_m^2 = \frac{E^2(1 - \omega^4 L^2 C^2) - V_{ac}^2}{\omega^2 L^2 + \omega^2 L_m^2 - \omega^6 L^2 L_m^2 C^2} \quad (23)$$

A dependence of $I_{ac}$ on L, C, E, and $L_m$ can be similarly found from the equation:

$$I_{ac}^2 = I_m^2 + \omega^2 C^2 V_m^2 = I_m^2 + \omega^2 C^2 (V_{ac}^2 + \omega^2 L^2 I_{ac}^2) \text{ as}$$

$$I_{ac}^2 = \frac{I_m^2 + \omega^2 C^2 V_{ac}^2}{1 - \omega^4 C^2 L^2} \quad (24)$$

The goal of off-line design optimization is to reach the point shown in equations (23) and (24), so that both the inverter 65A and the motor 75A are optimized for minimal current with unity power factor. Inverter bridge output voltage $V_{ac}$ is determined by the DC bus voltage input limit at inverter 65A. Output filter parameters L and C, motor back EMF E, and inductance $L_m$ need to be optimized for minimal current of the overall system during the optimization iteration process S142 shown in FIG. 3. Equations (20), (21), and (22) are useful for calculating the minimal inverter and motor currents at an optimized rated operation point. The inverter 65A and motor 75A are both running at unity power factor and with minimum current at the optimized rated operation point of motor drive system 45A. Significant to this off-line design optimization process is the consideration of a wide variety of parameters, as shown in step S124 in FIG. 3. Step S124 in FIG. 3 drives off-line design optimization for parameters Vac_max, L, C, E, and $L_m$ in the off-line design optimization of motor drive system 45A implemented in a motor controller system.

Figure 7C:
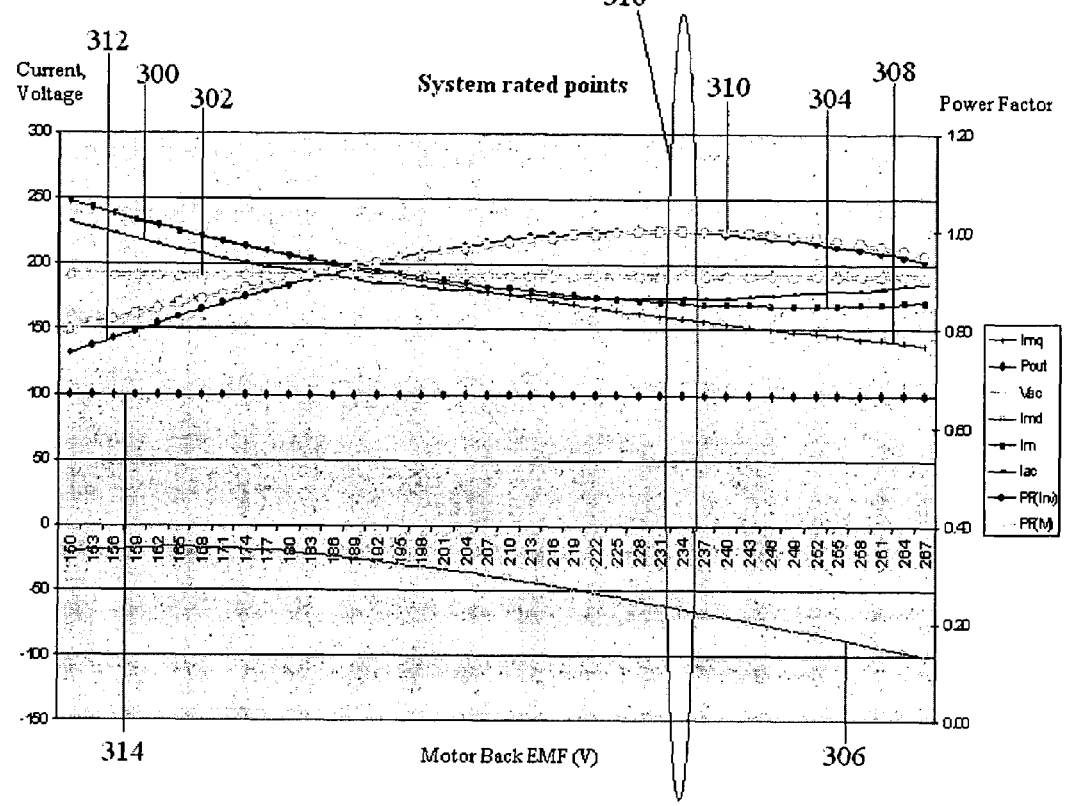
FIG. 7C illustrates an exemplary result of off-line design optimization iteration process of the rated operation point in a motor drive system with design/control optimization in accordance with an embodiment of the present invention.

FIG. 7C illustrates an exemplary result of off-line design optimization iteration process of the rated operation point in a motor drive system 45A with design/control optimization in accordance with an embodiment of the present invention. FIG. 7C shows an example of a "run" from the motor back EMF optimization process performed during the off-line design optimization step S124 in FIG. 3. Similar "runs" can be performed for optimization of parameters L, C, $L_m$, or other motor drive system parameters or combination of parameters. The circled region 316 on the graph is the optimized rated operation point where unity power factors for motor 75A and inverter 65A have been achieved. The optimized motor back EMF E value is found on the x-axis in circled region 316. Graphs 310 and 312 are graphs of motor 75A and inverter 65A power factors, PF(M) and PF(Inv), which attain the value of 1 (unity) at the optimized rated operation point 316. Graphs 300 and 304 are graphs of inverter 65A current $I_{ac}$ and motor 75A current $I_m$. Graph 302 is the inverter bridge output voltage $V_{ac}$, which is a constant determined by the maximum capability of the inverter 65A as well as by the limit of DC bus voltage input to inverter 65A. Graph 314 is the output power $P_{out}$, which is also a constant determined by the required specified power of motor drive system 45A at the rated condition. Graphs 306 and 308 represent the d-axis and q-axis components of motor 75A current, $I_{md}$ and $I_{mq}$. The squared sum of graphs 306 and 308 gives graph 304 for current $I_m$ of motor 75A.

Off-line design optimization of the motor drive system 45A for "rated operation" as in FIGS. 7B–FIG. 7C enables maximum efficiency at the rated design operating point. At another operating point, motor drive system 45A will deviate from the optimized minimal current operation if the motor drive system control is not optimized. A design-compatible on-line control methodology follows the off-line design optimization process. The on-line control methodology is used to optimize motor drive system 45A operating points to the maximum efficiency/power density.

Figure 8A:
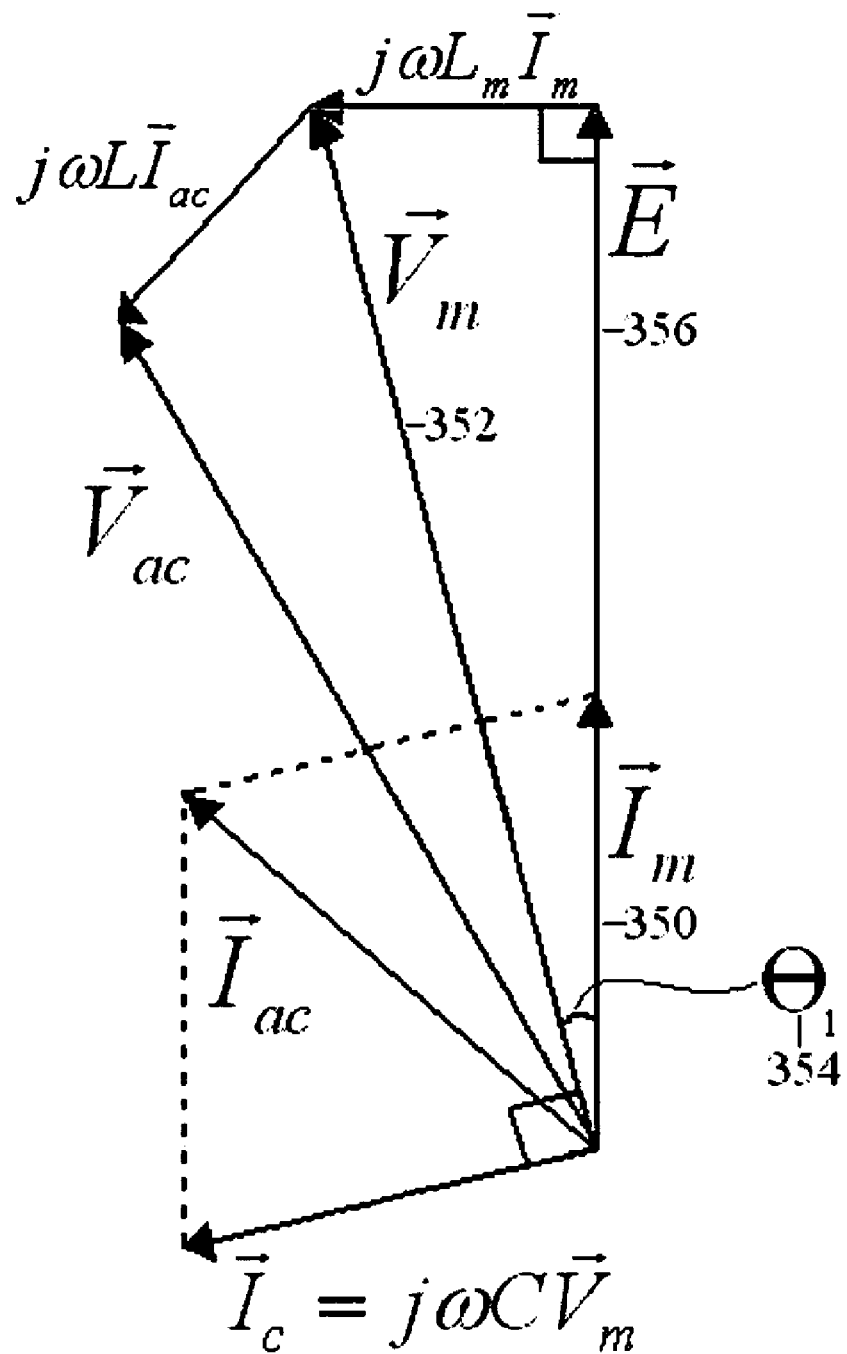
FIG. 8A is a vector diagram for on-line control optimization of the motor driving operation point before the AC output voltage limit has been reached in a motor drive system with design/control optimization according to an embodiment of the present invention.

FIG. 8A is a vector diagram for on-line control optimization of the motor driving operation point before the AC output voltage limit has been reached in a motor drive system 45A with design/control optimization according to an embodiment of the present invention. FIG. 8A is a vector diagram obtained from operations performed during the on-line control optimization step S134 in FIG. 3 before the AC output voltage limit for inverter 65 is reached. In this situation, the control of $I_{md}=0$ sets the minimum motor current, and consequently the inverter current operation point. When $I_{md}=0$, equation (12) $\vec{I}_m = I_{md} + jI_{mq}$ indicates that $\vec{I}_m$ is along the q-axis and is parallel to $\vec{E} = 0 + jE$. The vector diagram in FIG. 8A is obtained based on equations (11)–(17). As it can be seen in FIG. 8A, angle $\Theta_1$ (354) between $\vec{I}_m$ (350) and $\vec{V}_m$ (352) can never be zero because $\vec{V}_m$ includes the component $j\omega L_m \vec{I}_m$. Therefore the power factor for motor 75A cannot become unity when the AC output voltage is within its lower and upper limit values.

Figure 8B:
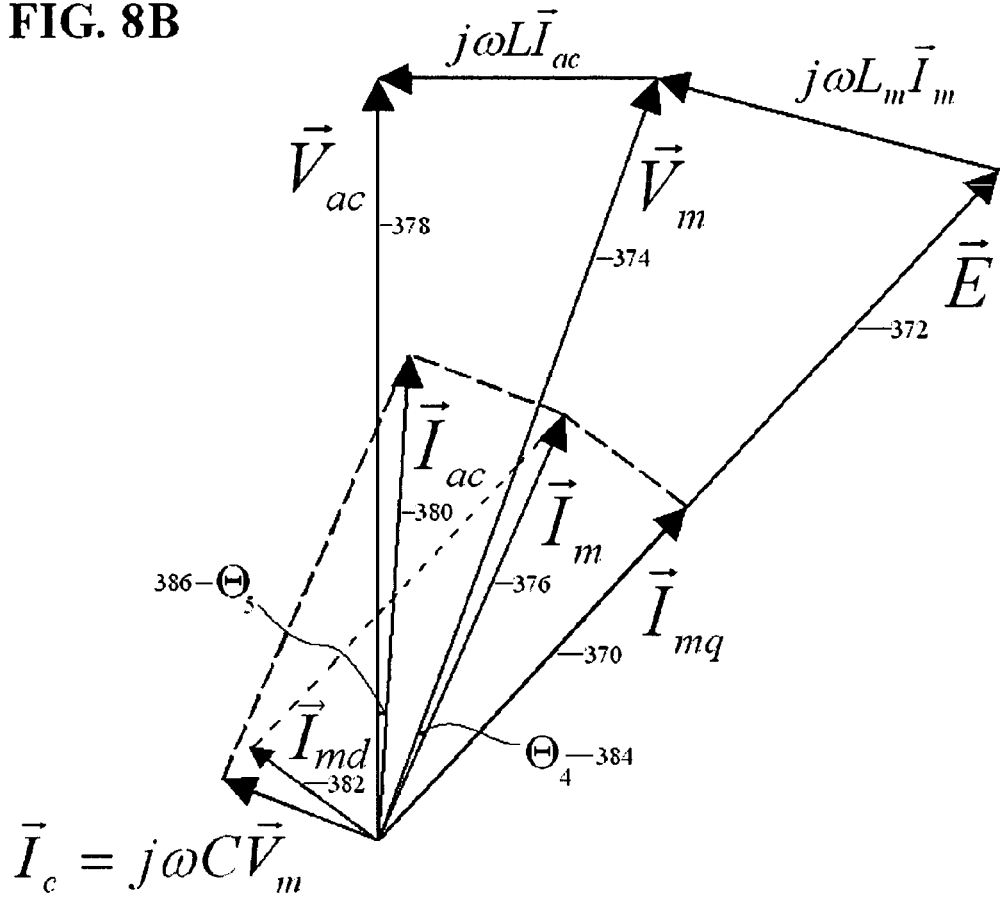
FIG. 8B is a vector diagram for on-line control optimization of the motor driving operation point after the AC output voltage limit has been reached in a motor drive system with design/control optimization according to an embodiment of the present invention.

FIG. 8B is a vector diagram for on-line control optimization of the motor driving operation point after the AC output voltage limit has been reached in a motor drive system 45A with design/control optimization according to an embodiment of the present invention. FIG. 8B is a vector diagram obtained from operations performed during the on-line control optimization step S134 in FIG. 3 after the inverter AC output voltage limit has been reached. FIG. 8B illustrates on-line control optimization achieved based on equations (11)–(17) for the entire operating range, so that both inverter 65A and motor 75A are optimized for the minimal current. The maximum DC bus voltage utilization is maintained, and the motor 75A current and inverter 65A currents are minimized. The following equations can be derived from equations (11)–(17) for on-line control optimization:

$$I_{mq} = \frac{P_{out}}{E_\omega} \text{ where } E_\omega = E * \frac{\omega}{\omega_{rated}} \quad (25)$$

$$K_L = \frac{L}{L_m + L} \quad (26)$$

$$K_{LmC} = \omega^2 L_m C \quad (27)$$

$$K_{LC} = \omega^2 LC \quad (28)$$

$$V_{ac\_d} = -\omega*(L_m+L)*I_{mq}*(1-K_L K_{LmC}) \quad (29)$$

$$V_{ac} = V_{ac\_max} = \quad (30)$$
$$V_{ac\_limit} * M_{max} = \frac{V_{dc}}{\sqrt{3}*\sqrt{2}} * [1 - 2*(T_{dead} + T_{min\,imal})*f_{sw}]$$

$$V_{ac\_q} = \sqrt{V_{ac\_max}^2 - V_{ac\_d}^2} \quad (31)$$

$$I_{md} = \frac{V_{ac\_q} - E_\omega*(1-K_{LC})}{\omega*(L_m+L)*(1-K_L K_{LmC})} \quad (32)$$

Table 1 shown in FIG. 11 includes detailed definitions of the variables present in the above equations. Equation (32) shows that the condition of maximum DC bus voltage utilization control can be achieved by controlling the d-axis $I_m$ current component $I_{md}$.

Two optimization control rules can be derived for on-line control optimization, from equation (32). On-line optimization control rule I is detailed in the equations below: if $$I_{md} = \frac{V_{ac\_q} - E_\omega*(1-K_{LC})}{\omega*(L_m+L)*(1-K_L K_{LmC})} \geq 0$$

that is, if $V_{ac\_q} - E_\omega*(1-K_{LC}) \geq 0$ that is, if $\sqrt{V_{ac\_max}^2 - V_{ac\_d}^2} - E_\omega*(1-K_{LC}) \geq 0$ then select $I_{md}=0$. \quad (33)

On-line optimization control rule II is detailed in the equations below:
if $$I_{md} = \frac{V_{ac\_q} - E_\omega*(1-K_{LC})}{\omega*(L_m+L)*(1-K_L K_{LmC})} < 0$$

that is, if $V_{ac\_q} - E*(1-K_{LC}) < 0$ that is, if $\sqrt{V_{ac\_max}^2 - V_{ac\_d}^2} - E_\omega*(1-K_{LC}) < 0$ then select $$I_{md} = \frac{V_{ac\_q} - E_\omega*(1-K_{LC})}{\omega*(L_m+L)*(1-K_L K_{LmC})}. \quad (34)$$

In the case of a motor drive system without output filters, as shown in FIG. 6, equations (25)~(29) can be simplified as follows:

$$I_{mq} = \frac{P_{out}}{E_\omega} \quad (35)$$

$$K_L = K_{LmC} = K_{LC} = 0 \quad (36)$$

$$V_{ac\_d} = -\omega*L_m*I_{mq} \quad (37)$$

$$V_{ac} = V_{ac\_max} = \quad (38)$$
$$V_{ac\_limit} * M_{max} = \frac{V_{dc}}{\sqrt{3}*\sqrt{2}} * [1 - 2*(T_{dead} + T_{min\,imal})*f_{sw}]$$

$$V_{ac\_q} = \sqrt{V_{ac\_max}^2 - V_{ac\_d}^2} \quad (39)$$

$$I_{md} = \frac{V_{ac\_q} - E}{\omega*L_m} \quad (40)$$

On-line optimization control rules I and II for a motor drive system without output filters are the same as the rules for a motor drive system with output filters described by equations (33) and (34).

Figure 8C:
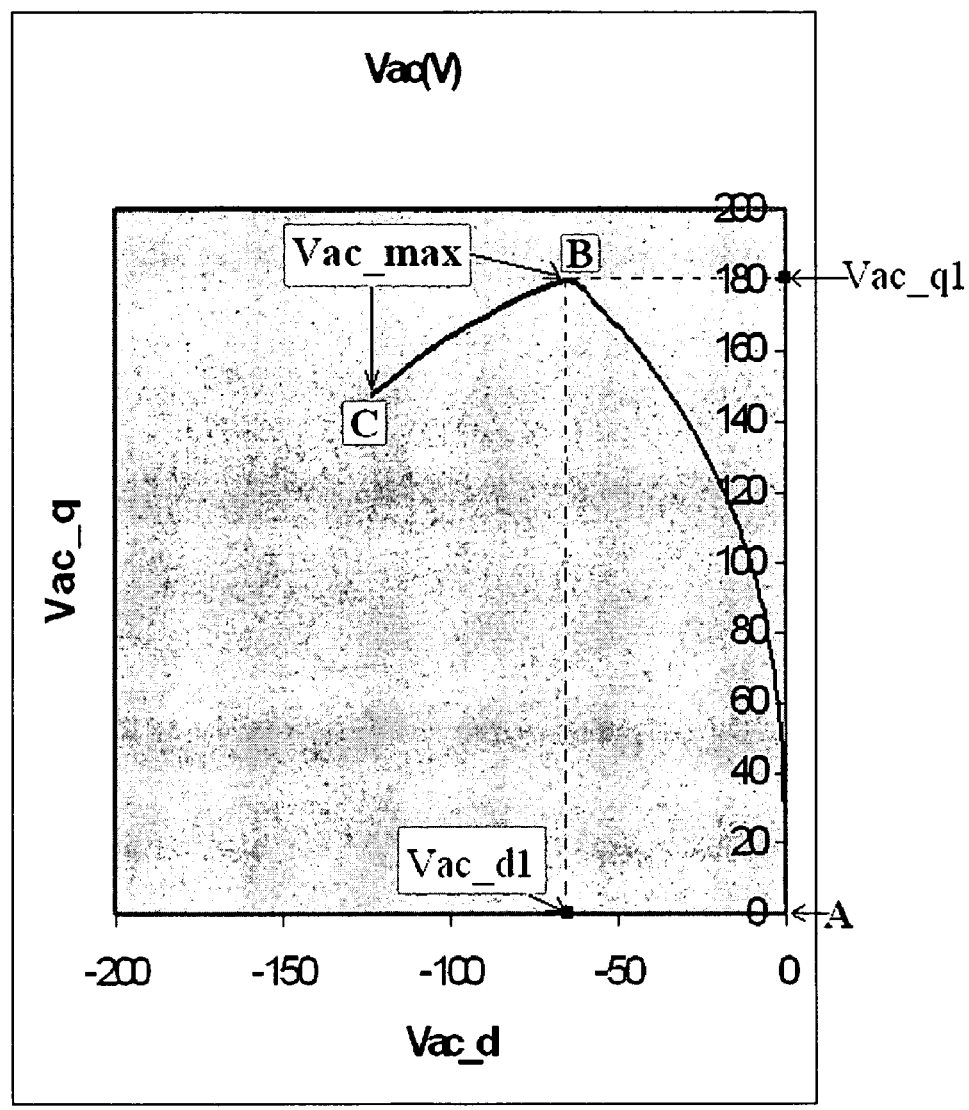
FIG. 8C illustrates the optimized inverter AC voltage vector over the whole operating range with on-line control optimization of a motor drive system with design/control optimization in accordance with an embodiment of the present invention.

FIG. 8C illustrates the optimized inverter AC voltage vector $\vec{V}_{ac}$ over the whole operating range with on-line control optimization of a motor drive system 45A with design/control optimization in accordance with an embodiment of the present invention. The graph in FIG. 8C plots the q-axis component of $V_{ac}$, $V_{ac\_q}$, versus the d-axis component $V_{ac\_d}$. Both components increase from zero value at zero speed (point A in FIG. 8C) to higher values with higher speed. From point A onwards to point B, $V_{ac\_q}$ is increasing faster than $V_{ac\_d}$. At point B in FIG. 8C, the maximum $V_{ac}$ value $V_{ac\_max}$ corresponding to maximum DC bus voltage utilization, has been reached. From point B onwards to point C, $V_{ac}$ stays constant at $V_{ac\_max}$. Since $V_{ac}^2 = V_{ac\_d}^2 + V a_{ac\_q}^2$, $V_{ac\_q}$ decreases while $V_{ac\_d}$ slowly increases from point B to point C in FIG. 8C. Point C represents the optimized inverter AC voltage for inverter 65 at the optimized motor driving rated operation point when DC bus limit is met. Hence, curve AB in FIG. 8C shows the operating range for $V_{ac}$ when on-line optimization control rule I described in equation (33) is applied, and curve BC shows the operating range for $V_{ac}$ when on-line optimization control rule II described in equation (34) is applied. Curve BC can continue beyond point C. The portion beyond point C would correspond to a motor drive system operating range with higher speed than the speed at the rated operating point.

Figure 8D:
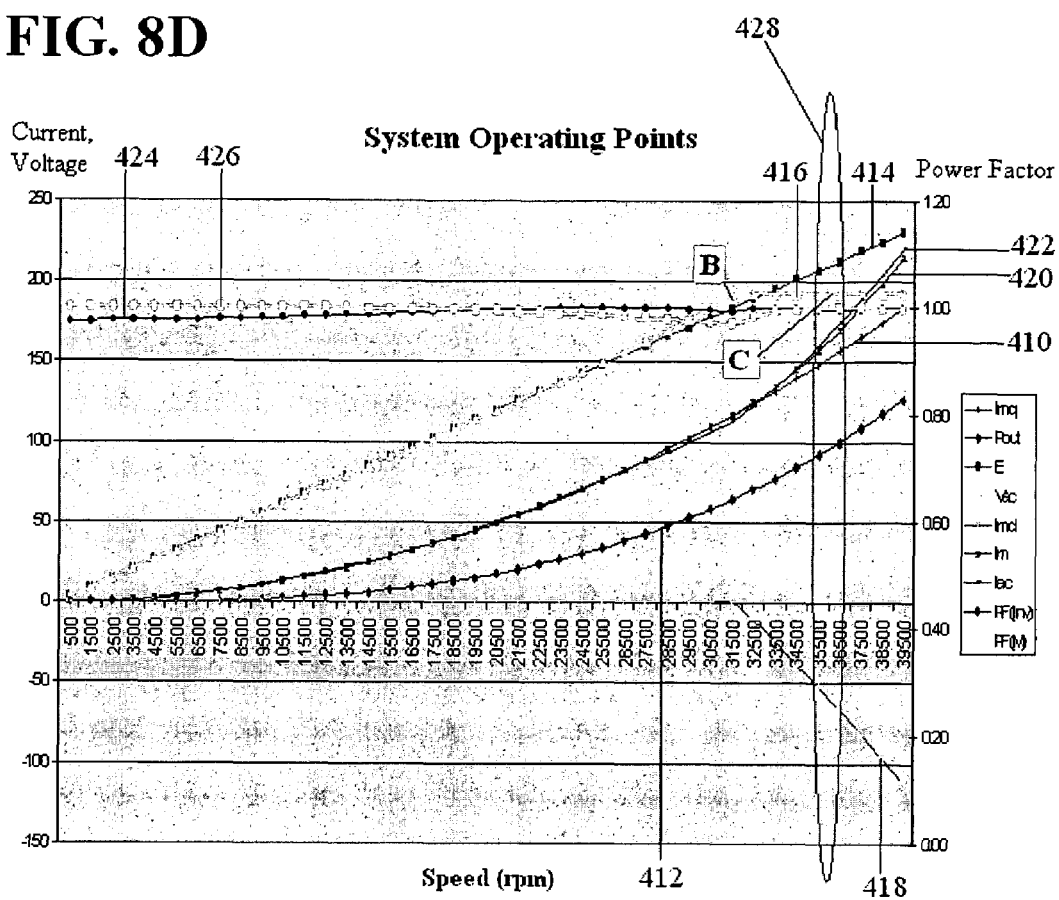
FIG. 8D illustrates an exemplary result of the on-line control optimization process of the motor driving operation point in a motor drive system with design/control optimization in accordance with an embodiment of the present invention.

FIG. 8D illustrates an exemplary result of the on-line control optimization process of the motor driving operation point in a motor drive system 45A with design/control optimization in accordance with an embodiment of the present invention. FIG. 8D shows an example of a "run" from the whole operating point optimization process of motor drive system 45A performed during the on-line control optimization step S134 in FIG. 3. The circled region 428 on the graph is the optimized rated operating point at which the DC bus voltage limit is met, representing the point where the unit power factors for motor 75A and inverter 65A, and the minimum inverter and motor currents have been achieved. Graphs 426 and 424 are graphs for motor 75A and inverter 65A power factors PF(M) and PF(Inv), which attain the value of unity at the optimized rated operation point 428. Graph 416 is the voltage $V_{ac}$, which reaches $V_{ac\_max}$ at point B (corresponding to point B in FIG. 8C), after which is remains constant. Point C on $V_{ac}$ graph 416 in FIG. 8D corresponds to point C in FIG. 8C. Graph 418 represents the d-axis motor current $I_{md}$, which is zero until $V_{ac}$ reaches $V_{ac\_max}$ (point B), and increases afterwards, as dictated by the application of on-line control optimization rules I and II from equations (33) and (34). Graph 410 represents the q-axis component $I_{mq}$ of motor 75A current $I_m$. $I_{mq}$ increases continuously with rotational speed as the power of motor drive system 45A increases. The $I_{mq}$ increase follows the general relationship between $I_{mq}$ and $P_{out}$ described in equation (25). Graphs 420 and 422 represent motor and inverter currents $I_m$ and $I_{ac}$, which attain minimal values at the controlled operating point. At the same time, unity power factors for inverter and motor are achieved in the optimized operation point region 428. Graph 414 is the motor back EMF E, which increases proportionally with rotational speed.

Figure 9:
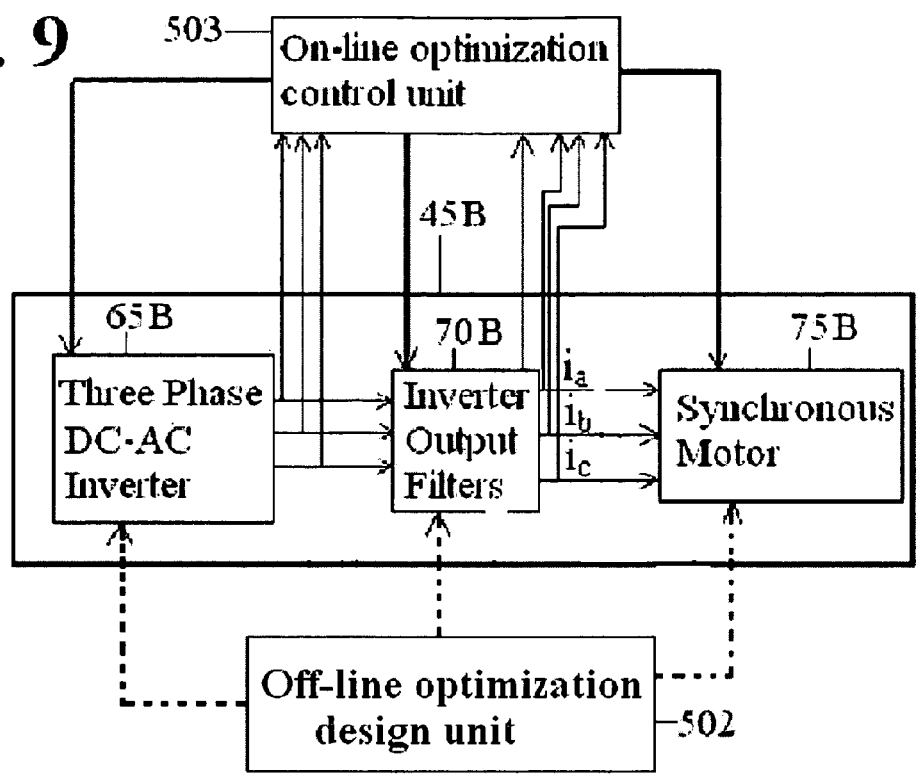
FIG. 9 is a schematic of a complete system for design/control optimization of a motor drive system in accordance with an embodiment of the present invention.

FIG. 9 is a schematic of a complete system for design/control optimization of a motor drive system 45B in accordance with an embodiment of the present invention. A system for design/control optimization of motor drive system 45B includes an off-line optimization design unit 502, and an on-line optimization control unit 503. Off-line optimization design unit 502 performs optimization iterations that determine and adjust motor drive system functional parameters to optimize motor drive system design. Off-line optimization design unit 502 then outputs the adjusted motor drive system design parameters. When the off-line design optimization process is completed, the motor drive system is physically designed and built, with motor, inverter, and filters exhibiting parameter values output by the off-line optimization design unit 502. When the motor drive system is ready for testing, the on-line optimization control unit 503 is activated. On-line optimization control unit 503 starts the operation of the inverter 65B with a DC input voltage within a specified range with an upper limit value. The on-line optimization control unit 503 also starts control of motor 75B rotor speed from zero to its functional upper limit listed in the motor 75B specification. On-line optimization control unit 503 receives feedback information from synchronous motor 75B, inverter output filters 70B, and three phase DC-AC inverter 65B. On-line optimization control unit 503 then performs on-line optimization of motor drive system 45B. For this purpose, on-line optimization control unit 503 applies on-line optimization control rules I and II described in equations (33)–(34) and sends control signals to three phase DC-AC inverter 65B.

Figure 10A:
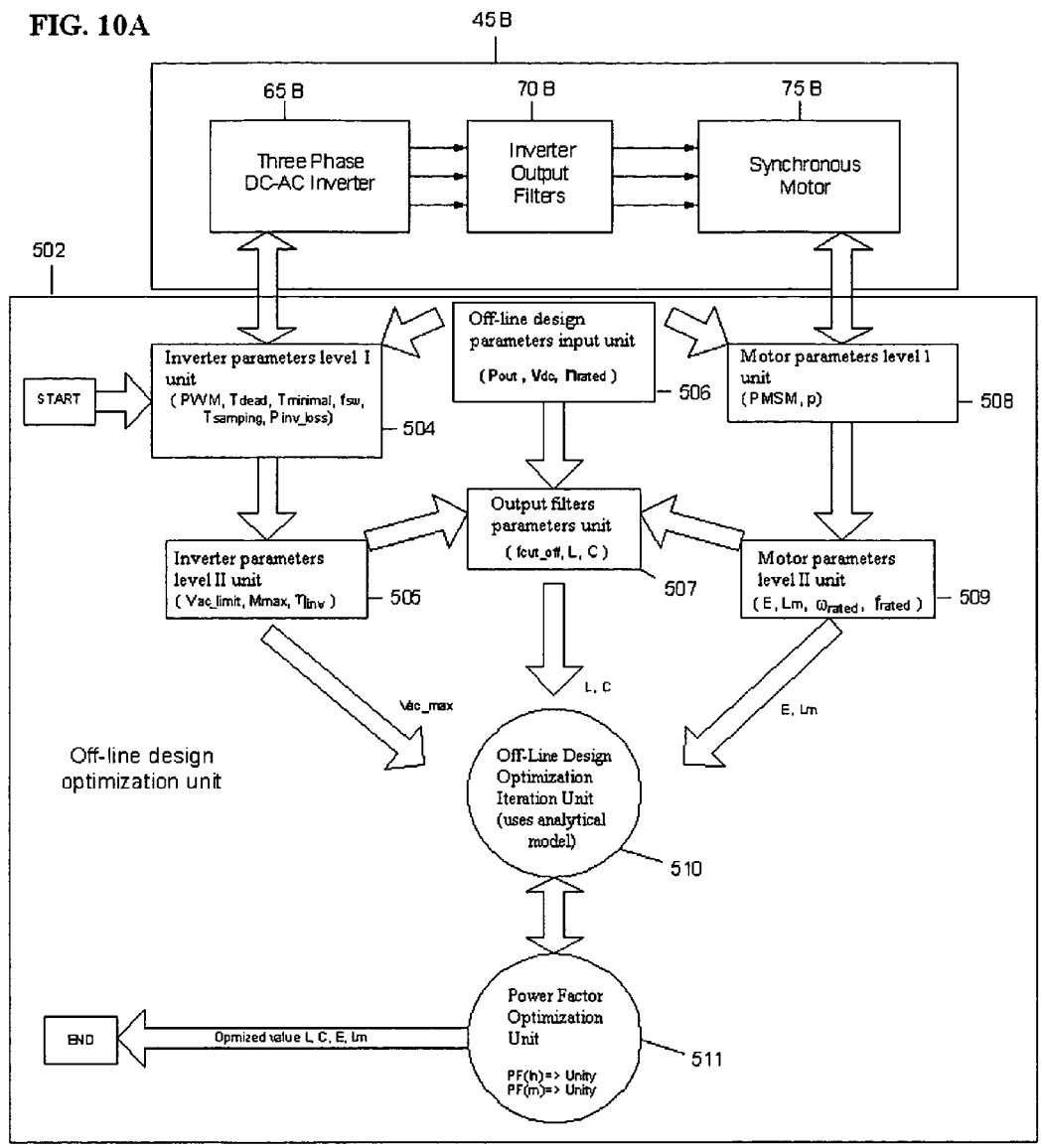
FIG. 10A is a functional block diagram of an off-line optimization design unit for design/control optimization of a motor drive system in accordance with an embodiment of the present invention.

FIG. 10A is a functional block diagram of an off-line optimization design unit 502 for design/control optimization of a motor drive system 45B in accordance with an embodiment of the present invention. Off-line optimization design unit 502 collects an extensive range of parameters from motor drive system 45B in inverter parameters level I unit 504, inverter parameters level II unit 505, motor parameters level I unit 508, motor parameters level II unit 509, output filters parameters unit 507, and off-line design parameters input unit 506. The definitions and relationships between parameters shown in FIG. 10A are detailed in Table 1 shown in FIG. 11. For exemplification, table 1 also shown typical values for parameters used in the design of the 100 KW/540V aircraft cabin air compressor motor drive system.

The parameters collected by units 504, 505, 506, 507, 508, and 509 are embedded into a smaller number of directly related parameters that may include L and C related to inverter output filters 70B, E and $L_m$ related to motor 75B, and $V_{ac\_max}$ related to inverter 65B. The resulting parameters are directed to the off-line design optimization iteration unit 510. Off-line design optimization iteration unit 510 performs iterations that optimize the values of L, C, E and $L_m$ to achieve the optimization goal of unity power factor for both inverter and motor at the rated operating point. The unity power control is set by power factor optimization unit 511. When off-line design optimization is complete, off-line optimization design unit 502 outputs optimized L, C, E and $L_m$ values.

Figure 10B:
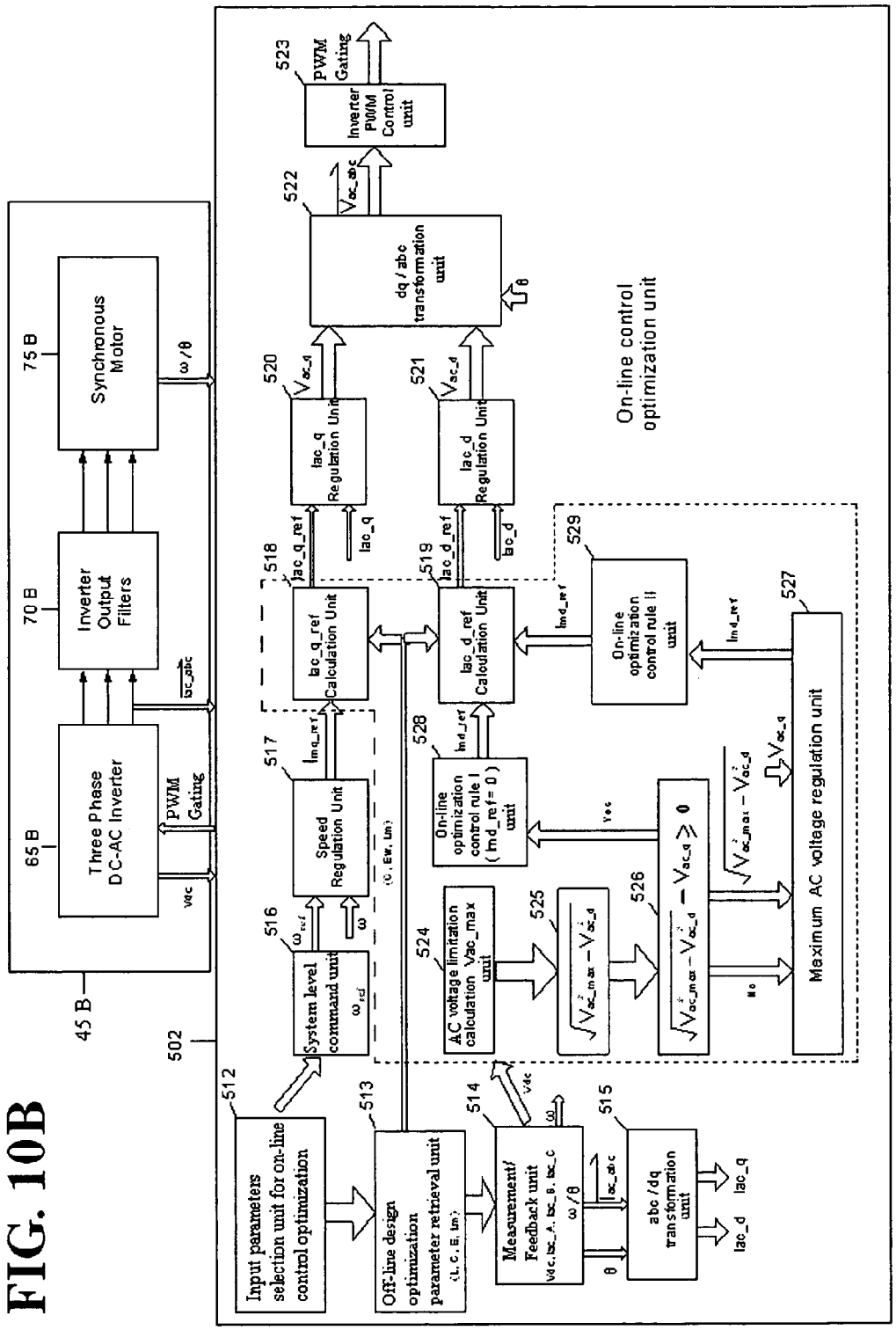
FIG. 10B is a functional block diagram of an on-line optimization control unit for design/control optimization of a motor drive system in accordance with an embodiment of the present invention.

FIG. 10B is a functional block diagram of an on-line optimization control unit 503 for design/control optimization of a motor drive system 45B in accordance with an embodiment of the present invention. The goal of on-line control optimization is minimal current operation in the whole operating range of motor drive system 45B. On-line control optimization starts with parameter information from the optimized rated operation point determined in the off-line optimization process. On-line control optimization is designed to accommodate drift of the operating point. Such drift of the operating point may occur due to variations of DC bus voltage or load conditions of motor drive system 45B. As shown in FIG. 10B, input parameters selection unit 512 for on-line control optimization selects input parameters in three steps.

First, parameters from off-line design optimization parameter retrieval unit 513 are stored for the feed forward calculation of $I_{ac\_q}$ in Iac_q_ref calculation unit 518, and of $I_{ac\_d}$ in Iac_d_ref calculation unit 519. The calculation of $I_{ac\_q}$ and $I_{ac\_d}$ is done according to the following equations derived from equation (15):

$$I_{ac\_d\_ref} = I_{md\_ref}(1-\omega^2 L_m C) - \omega C E_\omega \quad (41)$$

$$I_{ac\_q\_ref} = I_{mq\_ref}(1-\omega^2 C L_m) \quad (42)$$

$$E_\omega = E * \frac{\omega}{\omega_{rated}} \quad (43)$$

In the equations above, $E_\omega$ and E are the motor back EMFs at current speed $\omega$ and at rated speed $\omega_{rated}$ from off-line design optimization. The presence of inverter LC output filters 70B calls for the feed-forward compensation performed in units 518 and 519.

Secondly, measurement feedbacks from measurement/feedback unit 514 for DC voltage Vdc, rotor position θ and speed ω are sent to the AC voltage limitation calculation Vac_max unit 524. The components Iac_A, Iac_B and Iac_C of measured three phase current inverter $\vec{I}_{ac\_abc}$ are sent to the abc/dq transformation unit 515 which obtains the dq current components Iac_d and Iac_q. The dq current components Iac_d and Iac_q are later used by regulation units 520 and 521.

Thirdly, the input parameters from input parameters selection unit 512 are sent to system level command unit 516 which controls $\omega_{ref}$, hence driving the commanded operating point of motor drive system 45B. Speed command $\omega_{ref}$ and measured speed $\omega$ are then sent to the speed regulation unit 517, which generates the motor torque command Imq_ref.

The motor magnetic current command Imd_ref is also generated, based on the on-line control optimization rules I and II described by equations (33) and (34). For this purpose, AC voltage limitation calculation Vac_max unit 524 calculates the AC voltage limit based on the measured Vdc, as shown in equation (30). Unit 525 then uses equation (31) to calculate the $V_{ac\_q}$ limitation due to the DC voltage limitation. For the case when $I_{md}=0$, simplified equation (17) can also be used to obtain $$V_{ac\_q\_demand} = E_\omega * (1-\omega^2 LC) = E_\omega * (1-K_{LC}) \qquad (44)$$

Equation (44) gives the demanded Vac_q value when control $I_{md}=0$ applies.

On-line control optimization rules I and II described by equations (33) and (34) are applied forward in units 525, 526, 527, 528 and 529. Using equation (44) and on-line control optimization rule I, units 525, 526 and 528 implement on-line control optimization of motor drive system 45B as described below:

if $\sqrt{V_{ac\_max}^2 - V_{ac\_d}^2} - E_\omega*(1-K_{LC}) \geq 0$ that is, $\sqrt{V_{ac\_max}^2 - V_{ac\_d}^2} - V_{ac\_q\_demand}) \geq 0$ that is, if $\sqrt{V^2_{ac\_max} - V^2_{ac\_d}} - V_{ac\_q} \geq 0$, then set $I_{md\_ref}=0$.

Using on-line control optimization rule II, units 525, 526, 527 and 529 implement on-line control optimization of motor drive system 45B as described below:

if $\sqrt{V_{ac\_max}^2 - V_{ac\_d}^2} - E_\omega*(1-K_{LC}) < 0$ that is, if $\sqrt{V_{ac\_max}^2 - V_{ac\_d}^2} - V_{ac\_q\_demand}) < 0$ that is, if $\sqrt{V^2_{ac\_max} - V^2_{ac\_d}} - V_{ac\_q} < 0$, then use $\sqrt{V^2_{ac\_max} - V^2_{ac\_d}} - V_{ac\_q}$ as the input to regulate $I_{md\_ref}$ to the expected value $$\frac{\sqrt{V_{ac\_max}^2 - V_{ac\_d}^2} - E_\omega * (1-K_{LC})}{\omega * (L_m + L) * (1 - K_L K_{LmC})},$$

in order to keep the maximum AC voltage operating with the limited DC voltage value. Unit 527 can be implemented with feed-forward structure based on on-line control optimization rule II equations (34), or with feedback structure based on the error between $\sqrt{V^2_{ac\_max} - V^2_{ac\_d}}$ and $V_{ac\_q}$, or a combination of both rule II and error analysis.

$I_{ac\_q}$_ref and $I_{ac\_q}$_ref generated by the Iac_q_ref calculation unit 518 and Iac_d_ref calculation unit 519 are sent to Iac_q regulation unit 520 and Iac_d regulation unit 521 respectively. Units 520 and 521 compare optimized operating parameters of motor drive system 45B with actual operating parameters of motor drive system 45B and perform appropriate regulation of motor drive system operating parameters. Outputs of units 520 and 521 are sent to the dq/abc transformation unit 522 and then next to the inverter Pulse Width Modulation (PWM) control unit 523. The commanded PWM gating is then added to DC-AC inverter 65B to complete the on-line optimization control process.

FIG. 11 is a table containing typical values for design and operating parameters of the motor drive system used in the 100 KW/540V aircraft cabin air compressor system. Parameters in Table 1 can be used to better understand equations that describe design and control optimization of motor drive system 45.

The proposed invention presents a new overall design/control concept for a motor drive system to achieve an overall system optimization for maximum efficiency in the entire motor drive system operating range, under various inputs and load conditions. The technique described in the current invention can be applied to a motor drive system including various types of inverter output filters, as well as to a motor drive system without inverter output filters. The technique described in the current invention can be applied to synchronous motors with limited DC bus voltage.

We claim:

1. A method of optimizing performance of a motor drive system, said method comprising:
   selecting a property for a rated operation point;
   selecting inverter system characteristics and motor characteristics such that a motor drive system including an inverter system having the selected inverter system characteristics operatively connected to a motor having the selected motor characteristics will have a rated operation point exhibiting said property;
   providing an inverter system having said selected inverter system characteristics;
   operatively connecting a motor having said selected motor characteristics to said inverter system; and
   minimizing current of the motor drive system including said motor operatively connected to said inverter system in entire operating range of said motor drive system.

2. The method of optimizing performance of a motor drive system as recited in claim 1, wherein said property of said rated operation point is minimum current of said motor drive system.

3. The method of optimizing performance of a motor drive system as recited in claim 2, wherein said step of minimizing current of said motor drive system includes minimizing current of said motor.

4. The method of optimizing performance of a motor drive system as recited in claim 3, wherein said step of minimizing current of said motor drive system further includes maintaining maximum DC bus voltage utilization for said motor drive system after AC output voltage of said inverter system has reached a limit value.

5. The method of optimizing performance of a motor drive system as recited in claim 4, wherein said step of selecting inverter system characteristics and motor characteristics includes selecting inverter system characteristics and motor characteristics such that a motor drive system including an inverter system having the selected inverter system characteristics operatively connected to a motor having the selected motor characteristics will have maximum power factors of said motor and of said inverter system at said rated operation point exhibiting said property.

6. The method of optimizing performance of a motor drive system as recited in claim 5, wherein said motor characteristics include back electromotive force and inductance of said motor, and said inverter system characteristics include inductance and capacitance of filters included in said inverter system.

7. The method of optimizing performance of a motor drive system as recited in claim 6, wherein said step of minimizing current of said motor drive system includes maximizing power factors of said motor and of said inverter system.

8. The method of optimizing performance of a motor drive system as recited in claim 1, wherein said step of selecting inverter system characteristics and motor characteristics further includes using a mathematical model with equations relating to said rated operation point of said motor drive system, and using said equations in selection of inverter system characteristics and motor characteristics.

9. The method of optimizing performance of a motor drive system as recited in claim 1, wherein said step of minimizing current of said motor drive system further includes using a mathematical model with equations relating to said motor drive system, and deriving control optimization rules from said equations.

10. The method of optimizing performance of a motor drive system as recited in claim 1, wherein said property of said rated operation point is optimized overall performance of said motor drive system, and said step of minimizing current of said motor drive system further includes optimizing overall performance of said motor drive system.

11. A apparatus comprising:

a motor having motor characteristics; and an inverter system having inverter system characteristics;

wherein said motor characteristics and said inverter system characteristics are selected such that a motor drive system including said motor and said inverter system operatively connected to each other has a rated operation point with a predetermined property; and a controller operatively connected to said motor drive system, said controller minimizing current of said motor drive system in entire operating range of said motor drive system.

12. The apparatus according to claim 11, wherein said motor characteristics and said inverter system characteristics are selected such that a motor drive system including said motor and said inverter system operatively connected to each other has a rated operation point with a predetermined property of minimum current of said motor drive system.

13. The apparatus according to claim 12, wherein said controller maintains maximum DC bus voltage utilization for said motor drive system after AC output voltage of said inverter has reached its limit value.

14. The apparatus according to claim 13, wherein said motor characteristics and said inverter system characteristics are selected such that a motor drive system including said motor and said inverter system operatively connected to each other has a rated operation point with maximum power factors of said motor and of said inverter system.

15. The apparatus according to claim 14, wherein said inverter system comprises an inverter having inverter characteristics and a filter having filter characteristics, said inverter system characteristics being based on said inverter characteristics and said filter characteristics.

16. The apparatus according to claim 15, wherein said motor characteristics include back electromotive force and inductance of said motor, and said inverter system characteristics include inductance and capacitance of said filter.

17. The apparatus according to claim 16, wherein said motor is a synchronous motor.

18. The apparatus according to claim 11, wherein said motor characteristics and said inverter system characteristics are selected using a mathematical model with equations relating to said rated operation point of said motor drive system.

19. The apparatus according to claim 11, wherein said controller uses a mathematical model with equations relating to said motor characteristics and said inverter system characteristics, and derives control optimization rules from said equations.

20. The apparatus according to claim 11, wherein said property of said rated operation point is optimized overall performance of said motor drive system, and said controller optimizes overall performance of said motor drive system.

* * * * *